United States Patent
Babinsky et al.

(10) Patent No.: US 10,372,417 B2
(45) Date of Patent: *Aug. 6, 2019

(54) MULTIPLY-ADD OPERATIONS OF BINARY NUMBERS IN AN ARITHMETIC UNIT

(71) Applicant: International Business Machines Corporation, Armonk, NY (US)

(72) Inventors: Tina Babinsky, Steinenbronn (DE); Michael Klein, Schoenaich (DE); Cedric Lichtenau, Stuttgart (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,406

(22) Filed: Jul. 13, 2017

(65) Prior Publication Data

US 2019/0018653 A1 Jan. 17, 2019

(51) Int. Cl.
  *G06F 7/544* (2006.01)
  *G06F 5/01* (2006.01)
  *G06F 7/49* (2006.01)

(52) U.S. Cl.
  CPC .............. *G06F 7/5443* (2013.01); *G06F 5/01* (2013.01); *G06F 7/49* (2013.01)

(58) Field of Classification Search
  USPC ....................................................... 708/523
  See application file for complete search history.

(56) References Cited

U.S. PATENT DOCUMENTS

| | | |
|---|---|---|
| 5,941,940 A | 8/1999 | Prasad et al. |
| 6,606,700 B1 | 8/2003 | Sih et al. |
| 7,873,815 B2 | 1/2011 | Sih et al. |
| 2002/0099923 A1 | 7/2002 | Alidina et al. |
| 2003/0229659 A1 | 12/2003 | Halahmi et al. |
| 2006/0101242 A1 | 5/2006 | Siu et al. |
| 2006/0230095 A1 | 10/2006 | Simkins et al. |
| 2006/0288070 A1 | 12/2006 | Vadi et al. |
| 2011/0040815 A1 | 2/2011 | Penton et al. |
| 2011/0231460 A1 | 9/2011 | Ahmed |
| 2012/0011181 A1 | 1/2012 | Samy et al. |
| 2014/0244704 A1 | 8/2014 | Trong et al. |

(Continued)

OTHER PUBLICATIONS

Babinsky et al., "Multiply-Add Operations of Binary Numbers in an Arithmetic Unit," U.S. Appl. No. 15/897,472, filed Feb. 15, 2018.

(Continued)

*Primary Examiner* — David H Malzahn
(74) *Attorney, Agent, or Firm* — Jorge R. Maranto (57) ABSTRACT

Disclosed herein is a computer implemented method for performing multiply-add operations of binary numbers P, Q, R, S, B in an arithmetic unit of a processor, the operation calculating a result as an accumulated sum, which equals to $B+n \times P \times Q+m \times R \times S$, where n and m are natural numbers. Further disclosed herein is an arithmetic unit configured to implement multiply-add operations of binary numbers P, Q, R, S, B comprising at least a first binary arithmetic unit for calculating an aligned high part result and a second binary arithmetic unit for calculating an aligned low part result of the multiply-add operations.

13 Claims, 5 Drawing Sheets

(56) References Cited

U.S. PATENT DOCUMENTS

| | | |
|---|---|---|
| 2015/0347089 A1 | 12/2015 | Wang |
| 2019/0018653 A1* | 1/2019 | Babinsky .................. G06F 5/01 |
| 2019/0018654 A1* | 1/2019 | Babinsky .................. G06F 5/01 |
| 2019/0018655 A1* | 1/2019 | Babinsky .................. G06F 5/01 |

OTHER PUBLICATIONS

Hofmann et al., "Combining of Several Execution Units to Compute a Single Wide Scalar Result," U.S. Appl. No. 15/412,429, filed Jan. 23, 2017.
Babinsky et al., "Multiply-Add Operations of Binary Numbers in an Arithmetic Unit," U.S. Appl. No. 15/856,255, filed Dec. 28, 2017.
List of IBM Patents or Patent Applications Treated as Related, Signed Dec. 28, 2017, 2 pages.

* cited by examiner

MULTIPLY-ADD OPERATIONS OF BINARY NUMBERS IN AN ARITHMETIC UNIT

The present disclosure relates in general to data processing systems, in particular, to a computer implemented method, an arithmetic unit, a system and a computer program product for performing multiply-add operations of binary numbers A, B, C in an arithmetic unit of a processor.

BACKGROUND

To improve arithmetic processing most modern processors use a process called the fused-multiply-add (in the following abbreviated as FMA) process to combine a multiplication operation, e.g., A×C, and an addition operation, e.g., +B, for execution as a single instruction, e.g., A×C+B, where A, B, C are operands of the multiplication product A×C and the sum of B and the product. By performing two operations in a single instruction, the FMA process reduces overall execution time.

A number of widely used crypto algorithms are based on one or many long integer multiply instructions (e.g. 256 or 2048 bits). These are e.g. used when establishing a secure connection or for blockchains. For performance reasons these algorithms should be as fast and efficient as possible. New algorithms that are quantum computers resistant are arising like elliptic curve cryptography (ECC) which might also require fast throughput and will become soon the new standard and be widely used. These new algorithms, in order to be quantum resistant, do not rely on basic long multiplications, but also shifts of intermediate results as characteristic. Therefore an efficient and fast implementation of multiplication operations is needed for those new algorithms.

SUMMARY

A computer implemented method for performing multiply-add operations of binary numbers P, Q, R, S, B in an arithmetic unit of a processor is proposed. The operation is calculating a result as an accumulated sum, which equals to B+n×P×Q+m×R×S, where n and m are natural numbers, the method comprising the calculation steps for obtaining a result of the operation: (i) generating a shifted high part $B'_{HIGH}$ of the addend B by performing a right shift of the high part $B_{HIGH}$ of the addend B by n bits; (ii) generating a shifted first intermediate result by generating the multiplication product P×Q and adding the shifted high part $B'_{HIGH}$; (iii) generating a first intermediate result by performing a left shift of the shifted first intermediate result by n bits; (iv) generating a shifted low part $B'_{LOW}$ of the addend B by performing a right shift of the low part $B_{LOW}$ of the addend B by m bits; (v) generating a shifted second intermediate result by generating the multiplication product R×S and adding the shifted low part $B'_{LOW}$; (vi) generating a second intermediate result by performing a left shift of the shifted second intermediate result by m bits; and (vii) determining the accumulated sum as the result of the multiply-add operations by adding the first intermediate result to the second intermediate result.

The natural numbers n, m are advantageously in the range of {1, 2}, but in advantageous embodiments might even be higher. Due to an advantageous embodiment the binary number P may represent a high part of a multiplicand A and the binary number Q may represent a high part of a multiplicand C, whereas the binary number R may represent a low part of a multiplicand A and the binary number S may represent a low part of a multiplicand C of a multiply-add operation.

In particular, due to a present disclosure embodiment, the multiply-add operations of binary numbers may be implemented as two multiply-shift-add operations of binary numbers.

A vector multiply shift logic (VMSL) instruction may be implemented in arithmetic units to speed up long multiply instructions. Such algorithms may be based on an accumulated sum calculated by a multiply-add operation:

B+=P×Q+R×S, where P, Q, R, S, B are binary numbers, and +=means an addition calculating an accumulated sum.

As used herein, a multiply-add operation is a concatenated operation using addition operations and multiply operations.

Special algorithms, e.g. used in elliptic curve cryptography (ECC) may have additional requirements for the long multiply instructions:

B+=n×P×Q+m×R×S with n, m being natural numbers and n, m being 1 or 2.

A typical code would not be able to take advantage of a multiply-shift-add instruction as the products may nor may not be multiplied by two before being accumulated. Hence an implementation of ECC algorithm with state of the art multiply-shift-add instruction would have less than half the performance of the present disclosure.

Therefore advantageously an enhanced VMSL with shift support and no runtime overhead is proposed, comprising an instruction based on:

B+=n×P×Q+m×R×S with n, m being natural numbers. The numbers n, m may e.g. be 1 or 2, but higher natural numbers might be advantageous.

For performing the multiply-add operations the addend B is shifted for a number of n bits and then added to the product of the multiplication operands. Then the intermediate result is shifted back for the same amount of n bits. These operations may be performed in parallel on a single instruction, multiple data (SIMD) unit but is not limited to. Finally the two intermediate results are then combined in order to get the final result by adding the two high parts of the intermediate results and the two low parts of the intermediate results.

Advantageously the multiply-add operations may be implemented on an arithmetic unit comprising at least two binary arithmetic units. Then the shift operation may be implemented in a way that it does not affect the critical path through the unit as used for floating point numbers as no rounding and normalization is required.

According to a favourable embodiment of the disclosure the operation is performed on an integer arithmetic for two independent parts. Therefore two independent multiplication products are calculated. The shift operation is performed on the addend B and not on the multiplication product P×Q or R×S.

As used herein, the high part of a binary number is meaning the half part of the number with the most significant bits and the low part of a binary number is meaning the half part of the number with the least significant bits.

The shift operation is advantageously performed on the adder side and not on the side of the multiplier or rounder, because an add operation is performed much faster than a multiply operation. This means that the shift of the addend and the shift back of the addend are not critical in time. Shifting of the addend may be performed by e.g. 1 bit or 2 bit, yet higher multiplication numbers, like 4 for 3 bit shifting, might be appropriate too.

Advantageously the calculation of the high parts of the sum and the low parts may be performed in a serial or parallel path. A parallel path may have an additional advantage concerning timing of the whole multiply-add operation.

An existing guard bit logic in the arithmetic unit used for floating-point rounding may be reused for performing the multiply-add operations.

Advantageously the proposed enhanced VMSL may be implemented in a pipelined processor structure.

Further an arithmetic unit is proposed, being configured to implement a multiply-add operations of binary numbers P, Q, R, S, B, the operation calculating a result as an accumulated sum, which equals to $B+n \times P \times Q+m \times R \times S$, where n and m are natural numbers, comprising at least a first binary arithmetic unit for calculating an aligned high part result and a second binary arithmetic unit for calculating an aligned low part result of the multiply-add operation, each arithmetic unit comprising at least: (i) a multiplier connected to the dataflow for the high part P, Q or the low part R, S of the multiplication operands A, C and configured to compute a product of the high parts or a product of the low parts of the multiplication operands A and C; (ii) a right shifter connected to the dataflow of a high part $B_{HIGH}$ or a low part $B_{LOW}$ of the addend operand B, being configured to deliver a shifted high part $B'_{HIGH}$ or shifted low part $B'_{LOW}$ of the addend operand B; (iii) a first adder connected to an output of the multiplier and an output of the right shifter, being configured to deliver a shifted first intermediate result or a shifted second intermediate result; (iv) a left shifter connected to an output of the first adder, being configured to deliver a first or second intermediate result; (v) a second adder connected to an output of the left shifter of one arithmetic unit and to an output of a left shifter of the other arithmetic unit, wherein a carry-output of the second adder of the second arithmetic unit is connected to an input of the second adder of the first arithmetic unit; (vi) a normalizing and rounding unit connected to an output of the left shifter and a select circuit connected to outputs of the second adder and to outputs of the normalizing and rounding unit for delivering an aligned high part result or an aligned low part result. The natural numbers n, m are advantageously in the range of $\{1, 2\}$.

The proposed arithmetic unit comprising at least two binary arithmetic units may be intended for executing a multiply-add operation of binary numbers A, B, C according to the method described above.

As used herein, a shifter may be implemented as a shifter circuit, an adder as an adder circuit and a counter as a counter circuit.

Due to a further aspect, a data processing system for performing multiply-add operations of binary numbers P, Q, R, S, B is proposed, the operation using high parts P, Q and low parts R, S of multiplication operands A and C for calculating a result as an accumulated sum, which equals to $B+n \times P \times Q+m \times R \times S$, where n and m are natural numbers, the system comprising at least one arithmetic unit as described above.

Further, a favourable computer program product is proposed for performing multiply-add operations of binary numbers P, Q, R, S, B in an arithmetic unit of a processor is proposed, the operation calculating a result as an accumulated sum, which equals to $B+n \times P \times Q+m \times R \times S$, where n and m are natural numbers. The computer program product is comprising a computer readable storage medium having program instructions embodied therewith, the program instructions executable by the computer systems to cause the computer systems to perform a method comprising the calculation steps for obtaining a result of the operation: (i) generating a shifted high part $B'_{HIGH}$ of the addend B by performing a right shift of the high part $B_{HIGH}$ of the addend B by n bits; (ii) generating a shifted first intermediate result by generating the multiplication product $P \times Q$ and adding the shifted high part $B'_{HIGH}$; (iii) generating a first intermediate result by performing a left shift of the shifted first intermediate result by n bits; (iv) generating a shifted low part $B'_{LOW}$ of the addend B by performing a right shift of the low part $B_{LOW}$ of the addend B by m bits; (v) generating a shifted second intermediate result by generating the multiplication product $R \times S$ and adding the shifted low part $B'_{LOW}$; (vi) generating a second intermediate result by performing a left shift of the shifted second intermediate result by m bits; and (vii) determining the accumulated sum as the result of the multiply-add operation by adding the first intermediate result to the second intermediate result. The natural numbers n, m are advantageously in the range of $\{1, 2\}$.

BRIEF DESCRIPTION OF THE DRAWINGS

The present disclosure together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of the disclosure. Moreover, the drawings are intended to depict only typical embodiments of the disclosure and therefore should not be considered as limiting the scope of the disclosure.

The illustrative embodiments described herein provide a method, arithmetic unit, data processing system and computer program product for performing multiply-add operations of binary numbers P, Q, R, S, B in an arithmetic unit of a processor. The illustrative embodiments are sometimes described herein using particular technologies only as an example for the clarity of the description.

The illustrative embodiments may be used for a computer implemented method for performing multiply-add operations of binary numbers P, Q, R, S, B in an arithmetic unit of a processor, the operation calculating a result as an accumulated sum, which equals to $B+n \times P \times Q+m \times R \times S$, where n and m are natural numbers.

Due to an advantageous embodiment the binary number P may represent a high part of a multiplicand A and the binary number Q may represent a high part of a multiplicand C, whereas the binary number R may represent a low part of a multiplicand A and the binary number S may represent a low part of a multiplicand C of a multiply-add operation.

Figure 1:
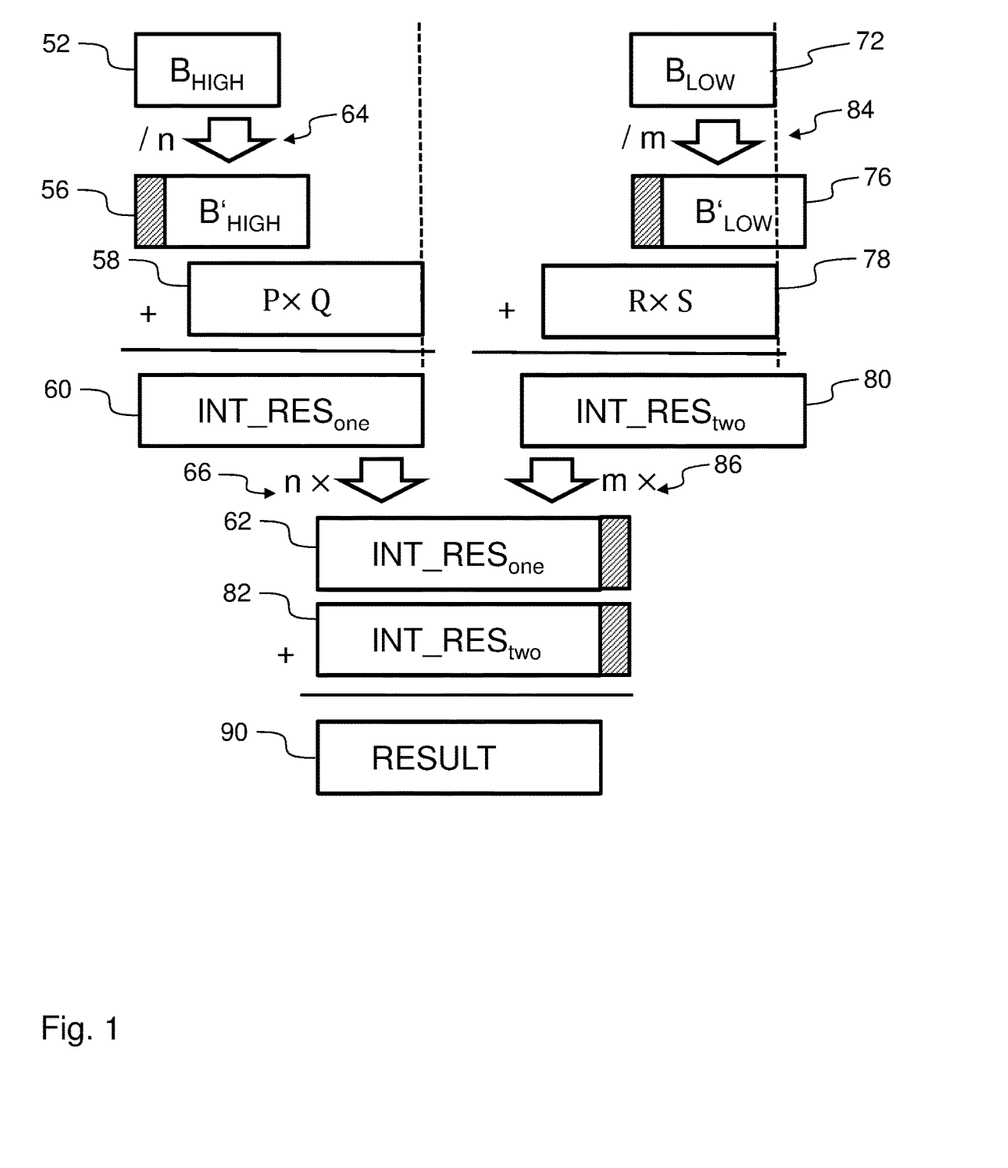
FIG. 1 depicts a data flow of a computer implemented method for performing multiply-add operations of binary numbers P, Q, R, S, B in an arithmetic unit of a processor according to an embodiment of the disclosure.

FIG. 1 depicts a data flow of a computer implemented method for performing multiply-add operations of binary numbers P, Q, R, S, B in an arithmetic unit of a processor according to an embodiment of the disclosure.

According to the present disclosure, the operation uses high parts P, Q and low parts R, S of multiplication operands A and C for calculating a result as an accumulated sum. The result then equals to $B+n \times P \times Q+m \times R \times S$, where n and m are natural numbers. In a first calculation step a shifted high part $B'_{HIGH}$ 56 of the addend B is generated by performing a right shift of the high part $B_{HIGH}$ 52 of the addend B by n bits. The right shift is indicated by arrow 64 as a division by n. Next a shifted first intermediate result 60 is generated by generating the multiplication product $P \times Q$ 58 and adding the shifted high part $B'_{HIGH}$ 56. Then a first intermediate result 62 is generated by performing a left shift of the shifted first intermediate result 60 by n bits. The left shift is indicated by arrow 66 as a multiplication by n.

In the same way a shifted low part $B'_{LOW}$ 76 of the addend B is generated by performing a right shift of the low part $B_{LOW}$ 72 of the addend B by m bits. The right shift is indicated by arrow 84 as a division by m. A shifted second intermediate result 80 is generated by generating the multiplication product $R \times S$ 74 and adding the shifted low part $B'_{LOW}$ 76. A second intermediate result 82 is generated by performing a left shift of the shifted second intermediate result 80 by m bits. The left shift is indicated by arrow 86 as a multiplication by m. Then the accumulated sum may be determined as the result of the multiply-add operation by adding the first intermediate result 62 to the second intermediate result 82.

The natural numbers n and m may be 1 or 2. For other calculations also higher natural numbers may be appropriate.

An existing guard bit logic of the arithmetic unit used for rounding, may be reused, in the case when m equals to 2, the shifted second intermediate result 82 may be rounded by the guard bit logic.

Figure 2:
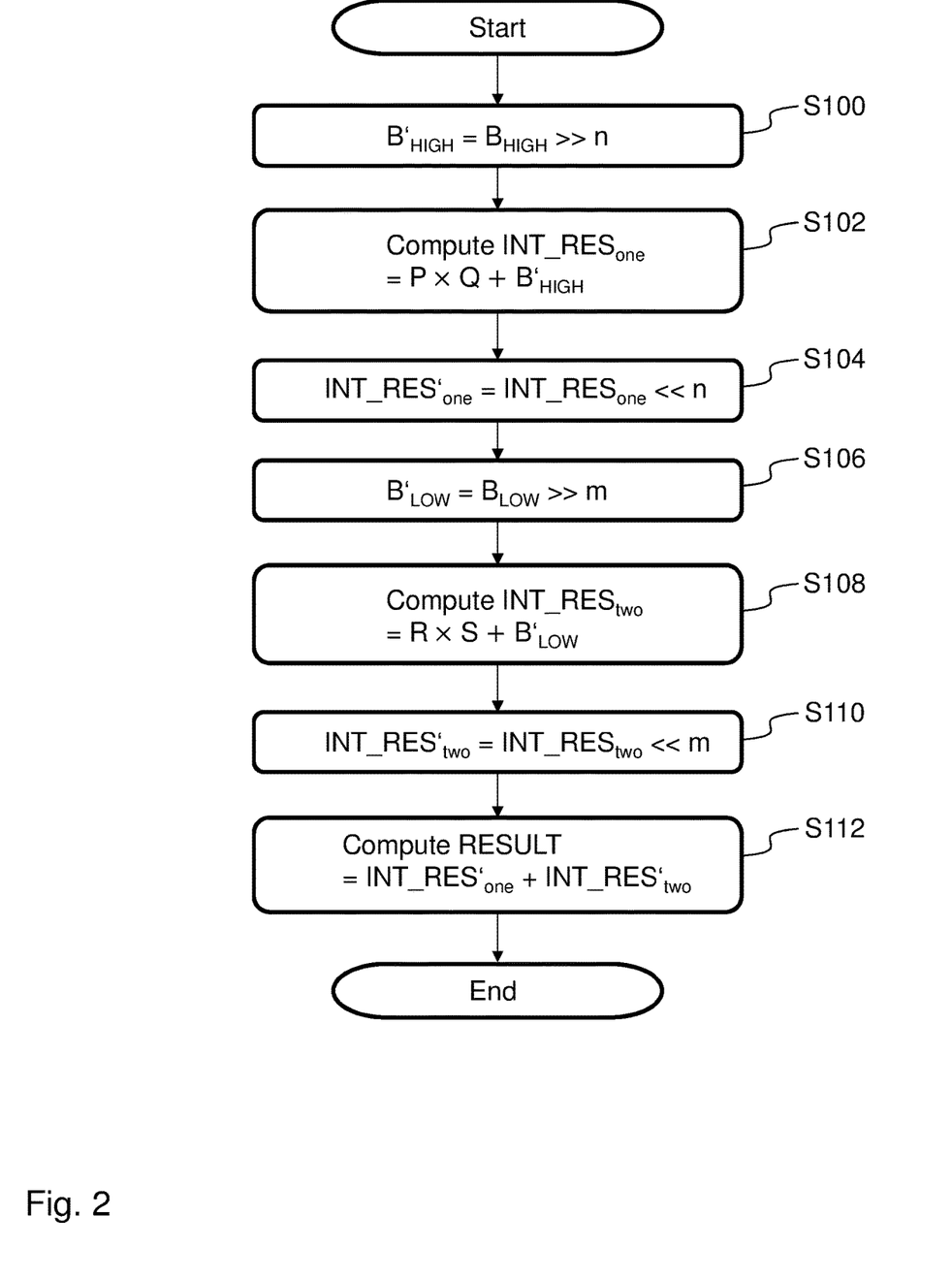
FIG. 2 depicts a flowchart of the data flow for calculating the high parts and the low parts of the binary numbers in a serial implementation according to an embodiment of the disclosure.

FIG. 2 depicts a flowchart of the data flow for calculating the high parts and the low parts of the binary numbers in a serial implementation according to an embodiment of the disclosure.

Performing the multiply-add operations of binary numbers P, Q, R, S, B according to the present disclosure the calculation of the accumulated sum may also be expressed like $(B_{HIGH}, B_{LOW})+2^g \times P \times Q+2^h \times R \times S$, where the exponents g and h may be natural numbers, e.g. 0 or 1 or even higher, with $n=2^g$ and $m=2^h$. In this expression the shifting of the multiplication operands is expressed by multiplication with $2^g$ and $2^h$, being the mathematical notation for the shifting operation.

In step S100 the shifted high part $B'_{HIGH}$ of the addend B is generated by performing a right shift (indicated by arrows) of the high part $B_{HIGH}$ of the addend B by n bits. Next in step S102 a shifted first intermediate result INT_RES$_{one}$ is generated by generating the multiplication product $P \times Q$ and adding the shifted high part $B'_{HIGH}$. Then in step S104 a first intermediate result INT_RES'$_{one}$ is generated by performing a left shift of the shifted first intermediate result by n bits, indicated by arrows.

In step S106 a shifted low part $B'_{LOW}$ of the addend B is generated by performing a right shift of the low part $B_{LOW}$ of the addend B by m bits. In step S108 a shifted second intermediate result INT_RES$_{two}$ is generated by generating the multiplication product $R \times S$ and adding the shifted low part $B'_{LOW}$. Next in step S110 a second intermediate result INT_RES'$_{two}$ is generated by performing a left shift of the shifted second intermediate result by m bits. Then in step S112 the accumulated sum may be determined as the result of the multiply-add operation by adding the first intermediate result INT_RES'$_{one}$ to the second intermediate result INT_RES'$_{two}$.

Figure 3:
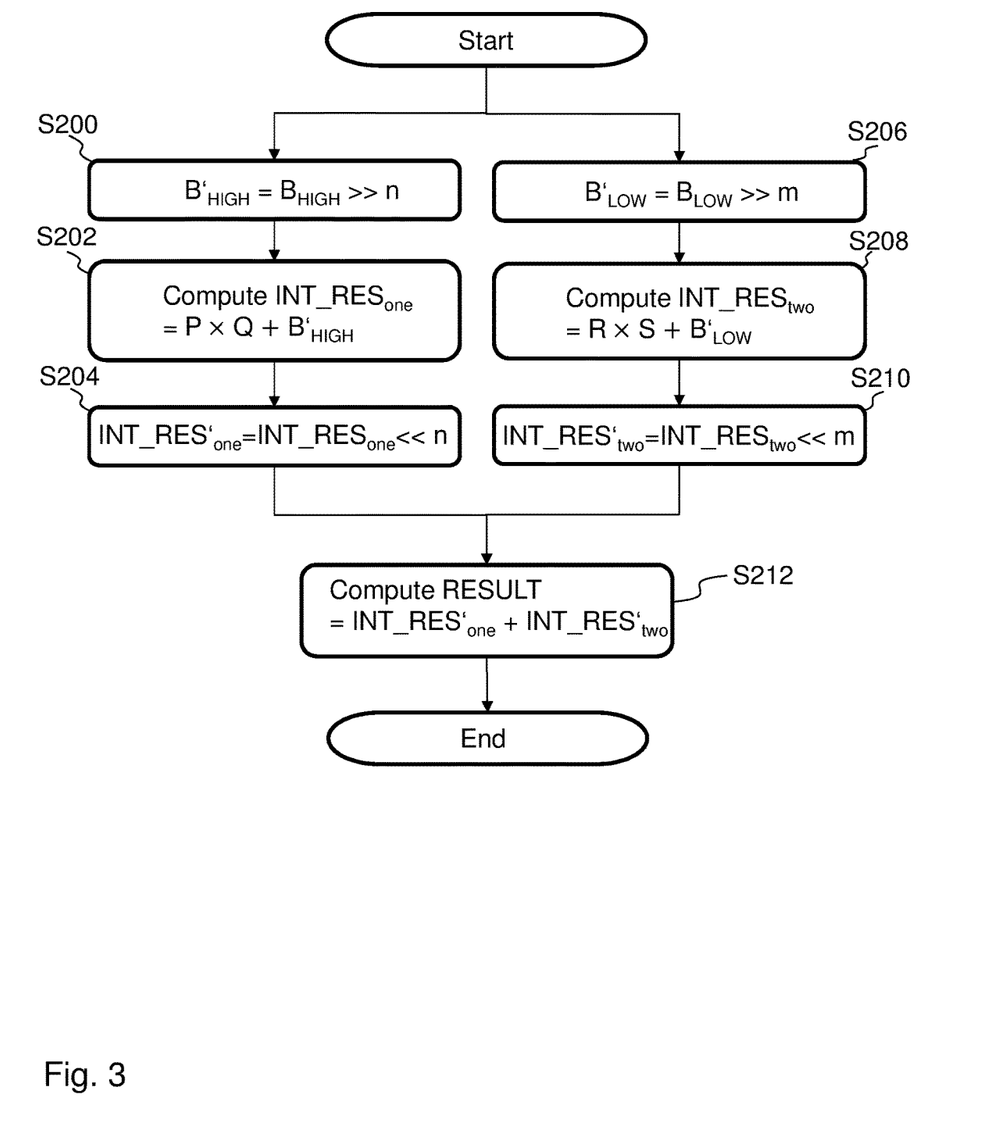
FIG. 3 depicts a flowchart of the data flow for calculating the high parts and the low parts of the binary numbers in a parallel implementation according to a further embodiment of the disclosure.

FIG. 3 depicts a flowchart of the data flow for calculating the high parts and the low parts of the binary numbers in a parallel implementation according to a further embodiment of the disclosure.

In FIG. 3 the data flow is changed in such a way that the steps S200, S202, S204 for determining the shifted high part $B'_{HIGH}$ of the addend B, generating the shifted first intermediate result INT_RES$_{one}$ and generating the first intermediate result INT_RES'$_{one}$ are performed in parallel to steps S206, S208, S210 for determining the shifted low part $B'_{LOW}$ of the addend B, generating the shifted second intermediate result INT_RES$_{two}$ and generating the second intermediate result INT_RES'$_{two}$. Then in step S212 the accumulated sum is determined as with the embodiment in FIG. 3 by adding the first intermediate result INT_RES'$_{one}$ to the second intermediate result INT_RES'$_{two}$.

Figure 4:
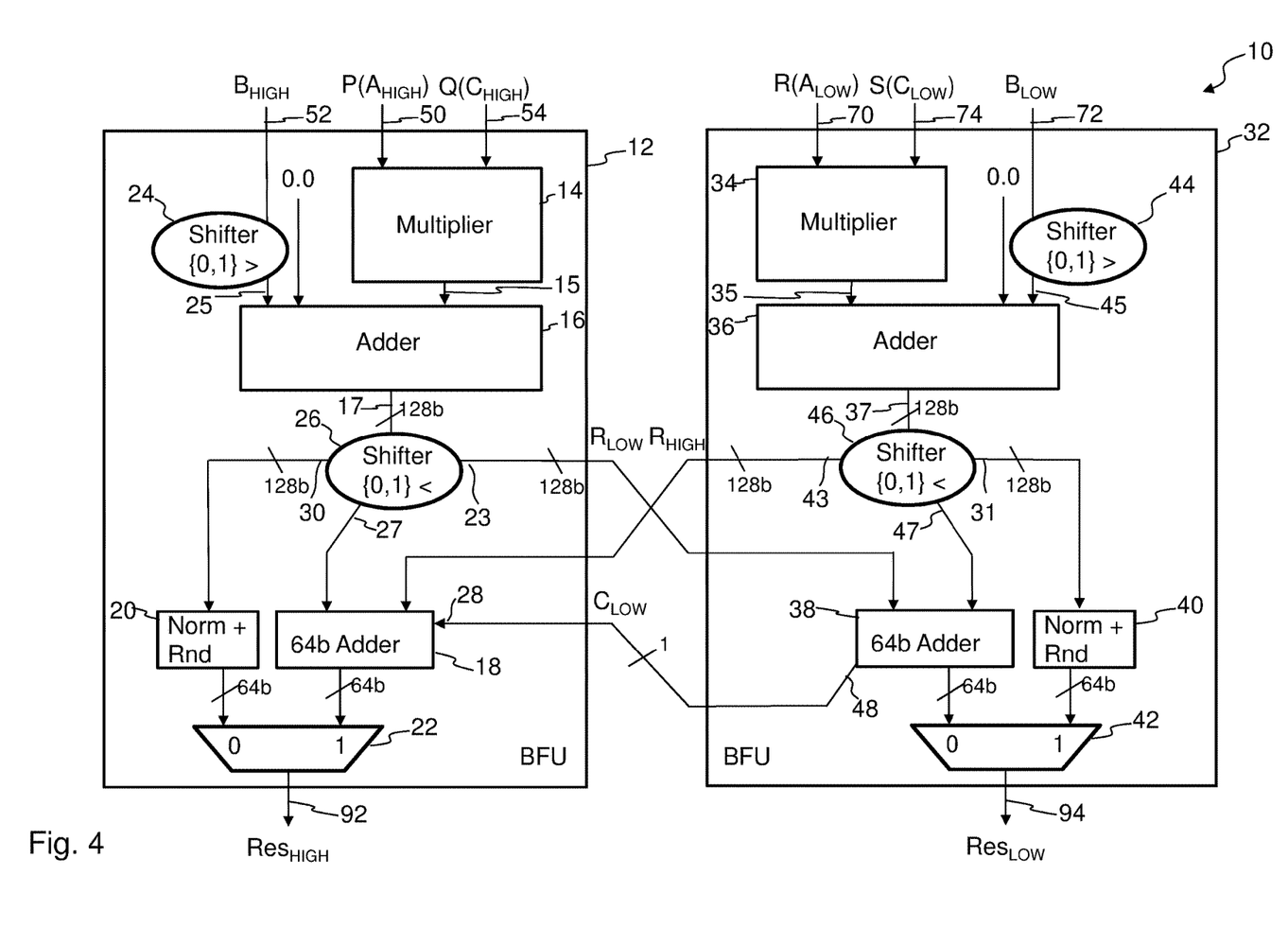
FIG. 4 depicts an example embodiment of an arithmetic unit being configured to implement multiply-add operations of binary numbers P, Q, R, S, B according to an embodiment of the disclosure.

FIG. 4 depicts an example embodiment of an arithmetic unit 10 being configured to implement multiply-add operations of binary numbers P, Q, R, S, B according to an embodiment of the disclosure and according to the method depicted in the data flow in FIG. 1.

The arithmetic unit 10 is configured to use high parts P 50, Q 54 and low parts R 70, S 74 of the multiplication operands A and C for calculating a result 90 as an accumulated sum, which equals to $B+n \times P \times Q+m \times R \times S$, where n and m are natural numbers. The numbers n, m may be, according to a first embodiment, 1 or 2, but may also be higher natural numbers, e.g. 4 or other power-of-two numbers.

The arithmetic unit 10 comprises a first binary arithmetic unit 12 for calculating an aligned high part result 92 and a second binary arithmetic unit 32 for calculating an aligned low part result 94 of the multiply-add operation. Each arithmetic unit 12, 14 comprises a multiplier 14, 34 connected to the dataflow for the high part P 50, Q 54 or the low part R 70, S 74 of the multiplication operands A, C. The multiplier 14, 34 is configured to compute a product of the high parts 58 or a product of the low parts 78 of the multiplication operands A and C. The arithmetic unit 10 further comprises a right shifter 24, 44 connected to the dataflow of a high part $B_{HIGH}$ 52 or a low part $B_{LOW}$ 72 of the addend operand B, which is configured to deliver a shifted high part $B'_{HIGH}$ 56 or shifted low part $B'_{LOW}$ 76 of the addend operand B. Further the arithmetic unit 10 comprises a first adder 16, 36 connected to an output 15, 35 of the multiplier 14, 34 and an output 25, 45 of the right shifter 24, 44, which is configured to deliver a shifted first intermediate result 60 or a shifted second intermediate result 80. The arithmetic unit 10 further comprises a left shifter 26, 46 connected to an output 17, 37 of the first adder 16, 36, which is configured to deliver a first intermediate result 62 or a second intermediate result 82. Further the arithmetic unit 10 comprises a second adder 18, 38 connected to an output 27, 47 of the left shifter 26 of one arithmetic unit 12 and to an output 43, 23 of a left shifter 46 of the other arithmetic unit 32, wherein a carry-output 48 of the second adder 38 of the second arithmetic unit 32 is connected to an input 28 of the second adder 18 of the first arithmetic unit 12. Further a normalizing and rounding unit 20, 40 implementing a guard bit logic device may be comprised, connected to an output 17, 37 of the first adder 16, 36, which may be reused for aligning the results of the shifters 26, 46. A select circuit 22, 42 may further be comprised, connected to outputs 19, 39 of the second adder 18, 38 and to outputs 21, 41 of the normalizing and rounding unit 20, 40 for delivering an aligned high part result 92 or an aligned low part result 94.

The left shifter 26 of the first arithmetic unit 12 is configured to deliver a low part of the first intermediate result 62 to the second adder 38 of the second arithmetic unit 32 and the left shifter 46 of the second arithmetic unit 32 is configured to deliver a high part of the second intermediate result 82 to the second adder 18 of the first arithmetic unit 12. Further a low part of the first intermediate result 62 is used as an input of the second adder 38 of the second arithmetic unit 32 and a high part of the second intermediate result 82 is used as an input of the second adder 18 of the first arithmetic unit 12. By this way the high part result 92 and the low part result 94 can be computed separately by the separate arithmetic units 12, 32 by adding the corresponding high parts of the first intermediate result 62 and the second intermediate results 82 as well as the low parts of the first intermediate result 62 and the second intermediate results 82 and the carry 28 generated by adder 38. Then advantageously the high part result 92 and the low part result 94 may be concatenated for calculating the result 90 of the multiply-add operations.

According to the present disclosure an embodiment of an arithmetic unit 10 depicted in FIG. 4 as well as according to the present disclosure method depicted in the data flow in FIG. 1, a VMSL shift of the addend B 52, 72 to the right is performed advantageously instead of a shift of the product 58, 78 to the left before a partial addition of the high parts or the low parts of the operands, respectively, followed by a shift of the shifted intermediate result 60, 80 back to the left before a final addition in order to get the result 90 of the multiply-add. By this way the critical path through the arithmetic unit 10 for all other instructions is not affected. This may advantageously provide e.g. up to double a speed over a conventional implementation of the multiply-add operations.

The right shifter 24 of the first arithmetic unit 12 is configured to perform right shifting of the high part $B_{HIGH}$ 52 of the addend B by g bits and the right shifter 44 of the second arithmetic unit 32 is configured to perform right shifting of the low part $B_{LOW}$ 72 of the addend B by h bits for performing the multiply-add operations according to the method described, with $n=2^g$ and $m=2^h$, as defined before The first adder 16, 36 may be initialized with an input of zero for starting the multiply-add operations, as the multiply-add operations is intended to calculate the addend B as an accumulated sum. Therefore an initial value of zero for the addend B may be appropriate.

The second adder 18, 38 may be implemented as a 64-bit adder in a favourable embodiment, being foreseen to perform addition operations for high parts or low parts of the first and second intermediate results 62, 82 only, whereas the first adder 16, 36 being implemented to deliver full width binary numbers. Yet advantageously adders with different bit widths may be used.

The adder 16, 36 may implement a guard-bit logic device 20, 40 for floating-point rounding that can be reused for aligning the first intermediate result 62 and/or the second intermediate result 82. Advantageously in the case when m equals to 2, the least significant bit of the shifted second intermediate result 80 may reuse the guard bit logic path. By this way an existing guard-bit logic of the binary arithmetic units 12, 32 may be reused, which means that no changes to a multiplier 14, 34 or adder 16, 36 might be necessary.

By using the two separate arithmetic units 12, 32 in the arithmetic unit 10 the shifted first intermediate result 60 and the shifted second intermediate result 80 may be generated in parallel steps.

Figure 5:
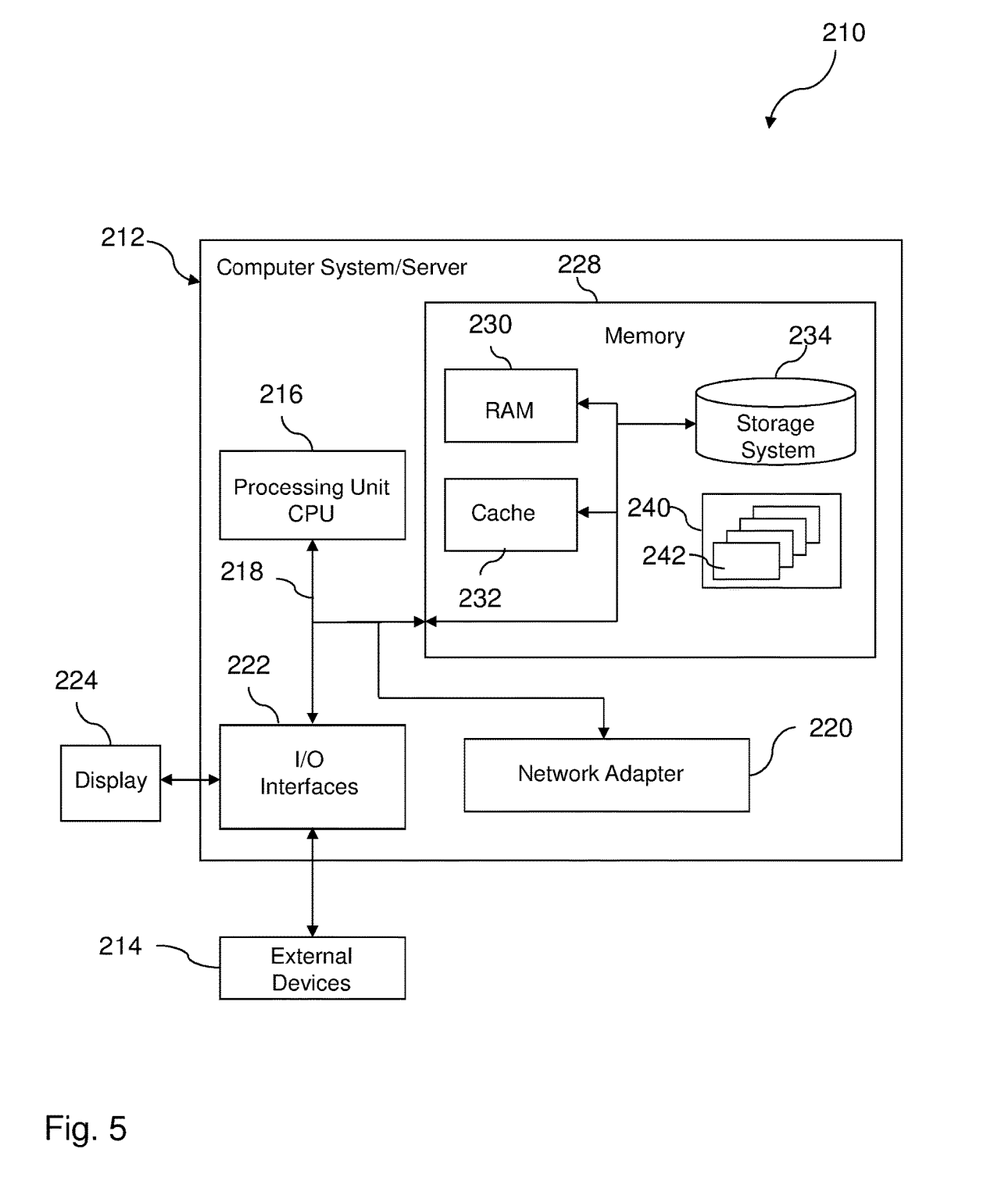
FIG. 5 depicts an example embodiment of a data processing system for executing a method according to the disclosure.

The arithmetic unit 10 according to an embodiment of the disclosure may advantageously be comprised in a data processing system 210 for performing a multiply-add operation of binary numbers P, Q, R, S, B the operation using high parts P 50, Q 54 and low parts R 70, S 74 of multiplication operands A and C for calculating a result 90 as an accumulated sum, which equals to B+n×P×Q+m×R×S, where n and m are natural numbers.

Referring now to FIG. 5, a schematic of an example of a data processing system 210 is shown. Data processing system 210 is only one example of a suitable data processing system and is not intended to suggest any limitation as to the scope of use or functionality of embodiments of the disclosure described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the disclosure as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An arithmetic unit configured to implement multiply-add operations of binary numbers P, Q, R, S, B, the operation calculating a result as an accumulated sum, which equals to $B+n \times P \times Q + m \times R \times S$, where n and m are natural numbers, comprising at least a first binary arithmetic unit for calculating an aligned high part result and a second binary arithmetic unit for calculating an aligned low part result of the multiply-add operation, each arithmetic unit comprising at least:
   a multiplier connected to the dataflow for the high part P, Q or the low part R, S of the multiplication operands A, C and configured to compute a product of the high parts or a product of the low parts of the multiplication operands A and C;
   a right shifter connected to the dataflow of a high part $B_{HIGH}$ or a low part $B_{LOW}$ of the addend operand B, being configured to deliver a shifted high part $B'_{HIGH}$ or shifted low part $B'_{LOW}$ of the addend operand B;
   a first adder connected to an output of the multiplier and an output of the right shifter, being configured to deliver a shifted first intermediate result or a shifted second intermediate result;
   a left shifter connected to an output of the first adder, being configured to deliver a first intermediate result or a second intermediate result;
   a second adder connected to an output of the left shifter of one arithmetic unit and to an output of a left shifter of the other arithmetic unit, wherein a carry-output of the second adder of the second arithmetic unit is connected to an input of the second adder of the first arithmetic unit; and
   a normalizing and rounding unit connected to an output of the left shifter and a select circuit connected to outputs of the second adder and to outputs of the normalizing and rounding unit for delivering an aligned high part result or an aligned low part result.

2. The arithmetic unit of claim 1, further the left shifter of the first arithmetic unit being configured to deliver a low part of the first intermediate result to the second adder of the second arithmetic unit and the left shifter of the second arithmetic unit being configured to deliver a high part of the second intermediate result to the second adder of the first arithmetic unit.

3. The arithmetic unit of claim 1, further the right shifter of the first arithmetic unit being configured to perform right shifting of the high part $B_{HIGH}$ of the addend B by n bits and the right shifter of the second arithmetic unit being configured to perform right shifting of the low part $B_{LOW}$ of the addend B by m bits.

4. The arithmetic unit of claim 3, further the natural numbers n and m being in the range of $\{1, 2\}$.

5. The arithmetic unit of claim 1, further the second adder being implemented as a 64-bit adder.

6. The arithmetic unit of claim 1, further part of a guard-bit logic device being reused for aligning the first intermediate result and/or the second intermediate result.

7. The arithmetic unit of claim 1, further the first adder being implemented to deliver full width binary numbers.

8. The arithmetic unit of claim 1, wherein the shifted first intermediate result and the shifted second intermediate result are generated in parallel steps.

9. The arithmetic unit of claim 6, wherein in the case when m equals to 2, the shifted second intermediate result is rounded by the guard bit logic device.

10. The arithmetic unit of claim 1, wherein the first adder is initialized with an input of zero for starting the multiply-add operations.

11. The arithmetic unit of claim 1, wherein a low part of the first intermediate result is used as an input of the second adder of the second arithmetic unit and a high part of the second intermediate result is used as an input of the second adder of the first arithmetic unit.

12. The arithmetic unit of claim 1 wherein the arithmetic unit is a component of a data processing system.

13. A computer program product for performing multiply-add operations of binary numbers P, Q, R, S, B in an arithmetic unit of a processor, the operation calculating a result as an accumulated sum, which equals to $B+n \times P \times Q + m \times R \times S$, where n and m are natural numbers, the computer program product comprising a computer readable storage medium having program instructions embodied therewith, the program instructions executable by the computer system to cause the computer system to perform a method comprising:

generating, by a right shifter of the arithmetic unit, a shifted high part $B'_{HIGH}$ of the addend B by performing a right shift of the high part $B_{HIGH}$ of the addend B by n bits;

generating, by a first adder of the arithmetic unit connected to an output of a multiplier and the right shifter, a shifted first intermediate result by generating the multiplication product P×Q and adding the shifted high part $B'_{HIGH}$;

generating, by a left shifter of the arithmetic unit, a first intermediate result by performing a left shift of the shifted first intermediate result by n bits;

generating, by the right shifter a shifted low part $B'_{LOW}$ of the addend B by performing a right shift of the low part $B_{LOW}$ of the addend B by m bits;

generating a shifted second intermediate result by generating the multiplication product R×S and adding the shifted low part $B'_{LOW}$;

generating a second intermediate result by performing a left shift of the shifted second intermediate result by m bits; and determining, by the arithmetic unit the accumulated sum as the result of the multiply-add operation by adding the first intermediate result to the second intermediate result.

* * * * *